(12) United States Patent
Gudmundsson et al.

(10) Patent No.: US 9,304,992 B2
(45) Date of Patent: Apr. 5, 2016

(54) STORY ELEMENT INDEXING AND USES THEREOF

(75) Inventors: Agust K. Gudmundsson, Hackettstown, NJ (US); Virginia Benson Chanda, Long Valley, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 156 days.

(21) Appl. No.: 13/546,866

(22) Filed: Jul. 11, 2012

(65) Prior Publication Data

US 2014/0019893 A1   Jan. 16, 2014

(51) Int. Cl.
G06F 3/048       (2013.01)
G06F 17/30      (2006.01)

(52) U.S. Cl.
CPC .................... *G06F 17/30011* (2013.01)

(58) Field of Classification Search
USPC ......... 715/764, 202, 241, 243, 712, 721, 730, 715/739, 776, 810, 817–820, 841, 845, 715/855; 345/901; 709/217; 725/39, 50
See application file for complete search history.

(56) References Cited

U.S. PATENT DOCUMENTS

| | | | | |
|---|---|---|---|---|
| 7,509,581 B1 * | 3/2009 | Song et al. | .................... | 715/721 |
| 7,797,328 B2 * | 9/2010 | Styles | ........................... | 707/758 |
| 8,065,302 B2 * | 11/2011 | Sridhar et al. | ................ | 707/736 |
| 8,296,797 B2 * | 10/2012 | Olstad et al. | .................... | 725/41 |
| 8,325,974 B1 * | 12/2012 | Killalea et al. | ............... | 382/100 |
| 9,026,934 B1 * | 5/2015 | Shah | ..................... | G06F 3/0483 715/776 |
| 2001/0056427 A1 * | 12/2001 | Yoon et al. | ..................... | 707/100 |
| 2007/0005653 A1 * | 1/2007 | Marsh | ........................ | 707/104.1 |
| 2007/0085858 A1 * | 4/2007 | Takimoto et al. | ............. | 345/619 |
| 2008/0141117 A1 * | 6/2008 | King et al. | ..................... | 715/238 |
| 2008/0247610 A1 * | 10/2008 | Tsunoda | ........... | G06F 17/30781 382/118 |
| 2011/0167462 A1 * | 7/2011 | O'Connor et al. | ............ | 725/110 |
| 2011/0231388 A1 * | 9/2011 | Kung et al. | ..................... | 707/711 |
| 2012/0036130 A1 * | 2/2012 | Light et al. | ..................... | 707/736 |
| 2012/0036423 A1 * | 2/2012 | Haynes et al. | ................ | 715/230 |
| 2012/0079372 A1 * | 3/2012 | Kandekar | ........... | G06F 17/2745 715/256 |
| 2012/0320416 A1 * | 12/2012 | Mbenkum et al. | ........... | 358/1.15 |
| 2013/0080881 A1 * | 3/2013 | Goodspeed | ............. | G06F 17/21 715/251 |
| 2013/0088511 A1 * | 4/2013 | Mitra et al. | .................... | 345/629 |

OTHER PUBLICATIONS

Murray, J. "Story-map: iPad Companion for Long Form TV Narratives." Jul. 6, 2012, In Proc. of the 10th European Conf. on Interactive TV and Video (pp. 223-226). New York, NY, USA: ACM.*

* cited by examiner

*Primary Examiner* — Linh K Pham
*Assistant Examiner* — Wendy Nicholas

(57) ABSTRACT

A story index of story elements is provided in which each story element is able to be referenced in a story by name and by language that does not include the name. The story index may also contain references to the same story elements in other associated stories, including other stories in a series or that are in a different type of media. An associated story presentation application program may enable a viewer to view the entries in the story index for a specified story element and to then view the specified story element at any of the referenced locations. The application may enable purchase or downloading of the associated stories.

7 Claims, 9 Drawing Sheets

| Book ID | Char ID | Name | Desc | Order |
|---|---|---|---|---|
| ... | ... | ... | ... | |
| 1234 | 9780001 | Harry Potter | Main character of the series. Son of James Potter and Lily Evans | 0 |
| 1234 | 9780001 | Harry James Potter | See Harry Potter | 1 |
| 1234 | 9781000 | Petunia Dursley | Sister or Lily Evans, Aunt of Harry Potter, Wife of Vernon Dursley, mother of Dudley Dursley | 0 |
| 1234 | 9781000 | Petunia Evans | Maidne Name of Petunia Dursley | 1 |
| 1234 | 9781001 | Vernon Dursley | Brother of Marge Dursley, Husband of Petunia Evans, Father of Dudley Durssley, Uncle of Harry Potter | 0 |
| 1234 | 9782000 | Ron Weasley | Son of Arthur Weasley and Molly Prewett, | 0 |
| 1234 | 9782000 | Ronald Bilius Weasley | See Ron Weasley | 1 |
| 1234 | 9782000 | Ronald Weasley | See Ron Weasley | 2 |
| 1234 | 9783000 | Hermione Granger | Muggle Born student in Harry's Grade | 0 |
| 1234 | 9783000 | Hermione Jean Granger | See Hermione Granger | 1 |
| 1234 | 9783213 | Garrick Ollivander | Wandmaker | 0 |
| ... | ... | ... | ... | |

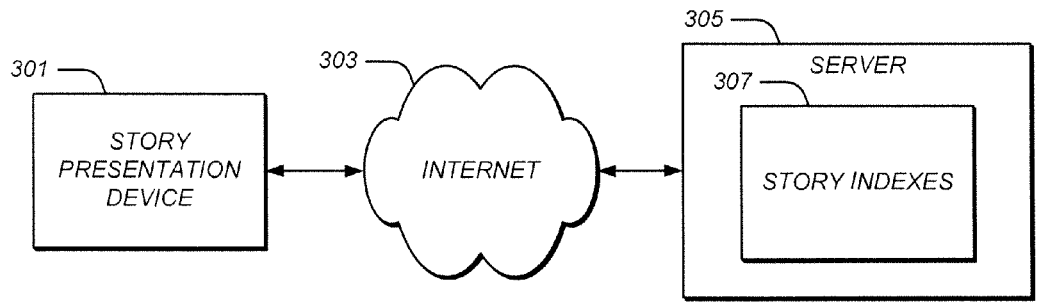

FIG. 3

| Book Id | Title | ISBN | Author |
|---|---|---|---|
| 1234 | Harry Potter and the Sorcerer's Stone | 978-0590353403 | J.K. Rowling |
| 2345 | Harry Potter and the Chamber of Secrets | 978-0439064866 | J.K. Rowling |
| 3456 | Harry Potter and the Prisoner of Azkaban | 978-0439136358 | J.K. Rowling |
| 4567 | Harry Potter and the Goblet of Fire | 978-0439139595 | J.K. Rowling |
| 5678 | Harry Potter and the Order of the Phoenix | 978-0439358064 | J.K. Rowling |
| 6789 | Harry Potter and the Half Blood Prince | 978-0439784542 | J.K. Rowling |
| 7890 | Harry Potter and the Deathly Hallows | 978-0545010221 | J.K. Rowling |

FIG. 4

| Book ID | Char ID | Name | Desc | Order |
|---|---|---|---|---|
| ... | ... | ... | ... | |
| 1234 | 9780001 | Harry Potter | Main character of the series. Son of James Potter and Lily Evans | 0 |
| 1234 | 9780001 | Harry James Potter | See Harry Potter | 1 |
| 1234 | 9781000 | Petunia Dursley | Sister or Lily Evans, Aunt of Harry Potter, Wife of Vernon Dursley, mother of Dudley Dursley | 0 |
| 1234 | 9781000 | Petunia Evans | Maidne Name of Petunia Dursley | 1 |
| 1234 | 9781001 | Vernon Dursley | Brother of Marge Dursley, Husband of Petunia Evans, Father of Dudley Durssley, Uncle of Harry Potter | 0 |
| 1234 | 9782000 | Ron Weasley | Son of Arthur Weasley and Molly Prewett, | 0 |
| 1234 | 9782000 | Ronald Bilius Weasley | See Ron Weasley | 1 |
| 1234 | 9782000 | Ronald Weasley | See Ron Weasley | 2 |
| 1234 | 9783000 | Hermione Granger | Muggle Born student in Harry's Grade | 0 |
| 1234 | 9783000 | Hermione Jean Granger | See Hermione Granger | 1 |
| 1234 | 9783213 | Garrick Ollivander | Wandmaker | 0 |
| ... | ... | ... | ... | |

*FIG. 5*

| CharID | Book Id | Chapter | Page | Href |
|---|---|---|---|---|
| 978001 | 1234 | 1 | 1 | <a href="http.c1_p1_12.html" </a> |
| 978001 | 1234 | 1 | 2 | <a href="http.c1_p2_14.html" </a> |
| 978001 | 1234 | 1 | 6 | <a href="http.c1_p6_11.html" </a> |
| 978001 | 1234 | 1 | 8 | <a href="http.c1_p8_17.html" </a> |
| 978001 | 1234 | 1 | 12 | <a href="http.c1_p12_13.html" </a> |

*FIG. 6*

STORY ELEMENT INDEXING AND USES THEREOF

BACKGROUND

Description of Related Art

Viewers of stories that are contained on media such as e-books and videos may wish to learn more or find other instances about an element in a story, such as a character, quote, location, or important object. This information may be found in other parts of the story and/or in related stories that may be contained in other e-books and videos. However, it may be difficult and time-consuming to locate some or all of the desired information.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3 illustrates a different example of a story presentation device in which the story indexes are within an external Internet server, rather than within the story presentation device.

FIG. 4 illustrates an example of a portion of one of the story indexes illustrated in FIG. 1, namely a table of a related series of stories, each containing references to some of the same story elements.

FIG. 5 illustrates an example of another portion of one of the story indexes illustrated an FIG. 1, namely a table of story elements that are characters in this example.

FIG. 6 illustrates an example of another portion of one of the story indexes illustrated in FIG. 1, namely a table of story element locations.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
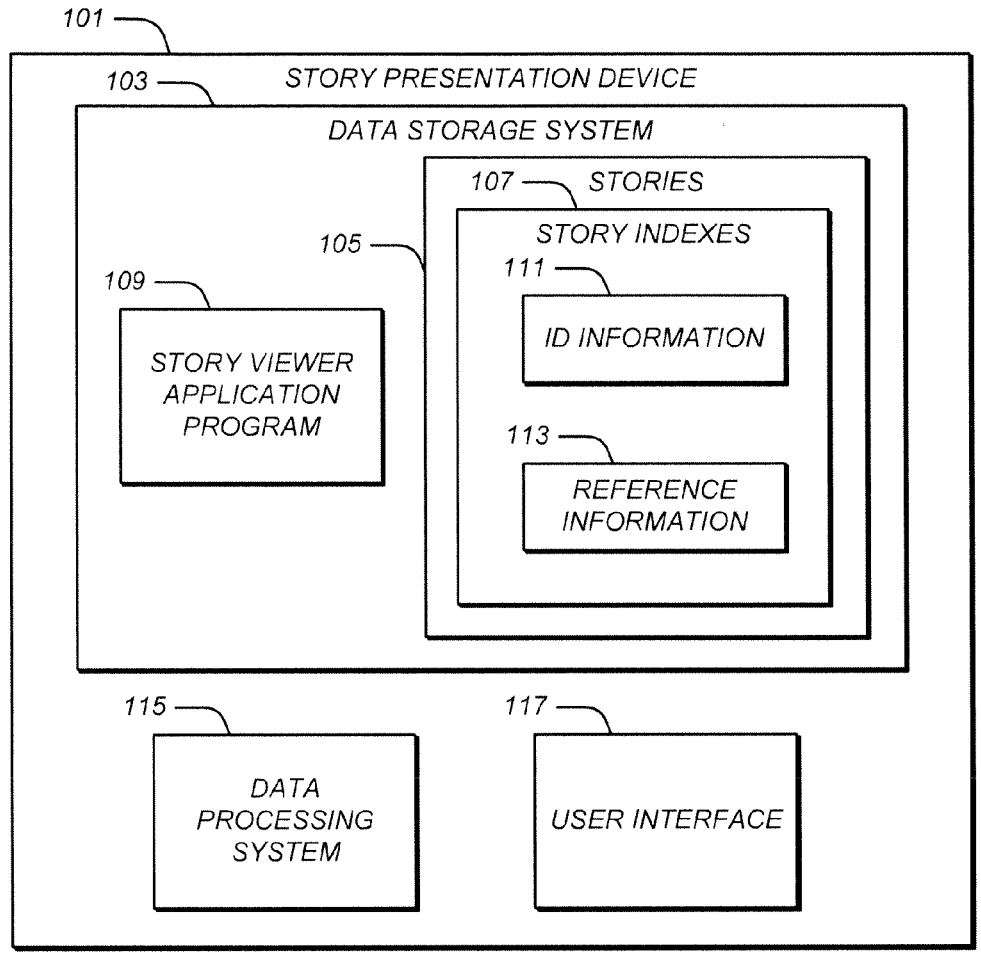
FIG. 1 illustrates an example of a story presentation device containing one or more stories, one or more story indexes, a story presentation application program, and other components.

FIG. 1 illustrates an example of a story presentation device 101 containing one or more stories 105, one or more story indexes 107, a story presentation application program 109, and other components.

The stories 105 may be of any type. For example, the stories may be fictional or non-fictional or a combination of them. The stories may also be news reports or any other type of reports or information presentations.

The story presentation device 101 may be of any type. For example, the story presentation device 101 may be a mobile device such as an eReader, a tablet computer, a smart phone, or a laptop computer, or a stationary device such as a desktop computer. The story presentation device 101 may be configured to view stories in any form, such as in the form of e-books and/or videos.

The story presentation device 101 includes a data storage system 103. The data storage system 103 is configured to store information, such as the stories 105, the story presentation application program 109, and the story indexes 107. The data storage system 103 may be a non-transitory, tangible, computer-readable storage medium that includes any type of computer storage device or devices, such as one or more flash memories, hard disk drives, and/or RAMs. All or portions of the data storage system 103 may instead be remote from the story presentation device, such as in one or more servers in an Internet cloud. As illustrated in FIG. 1, the story indexes 107 may be part of the stories 105, such as when the stories are in e-books. They may instead be separate from the stories, such as when the stories are videos.

Certain stories 105 may be related to other stories. For example, a set of stories may be part of a series (e.g., Harry Potter, Lord of the Rings, Chronicles of Narnia, James Bond, Poirot). Each story includes story elements, i.e., subjects that are referenced in the story, such as characters (e.g., people, creatures), locations, and objects. Some of these elements may be integral and link the related stories. Each story element is associated with a unique name and/or a unique code that is used by a processor within the story presentation device 101 or a processor external to the story presentation device 101 to distinguish it from all of the other story elements (and thereby allow the name and/or code to be used for indexing).

Each story element may be referenced one or more times in a particular story. One or more of the same story elements may also be referenced in other stories, such as in other stories that are in a series of stories. The related stories may be in the same type of media (e.g., all in e-books), or in different types of media (e.g., in e-books and in videos). The related stories may even be on a website. Thus, all stories in a series in the same format may be indexed in the same story index and, if desired, related stories in a different format (or even the same format) but different authors may be indexed in the same story index. For example, the Harry Potter books may be indexed and linked with the associated films; the Ian Fleming James Bond novels may be indexed and linked with the associated films as well as non-Ian Fleming (e.g., John Gardner and Raymond Bensen) novels in which James Bond appears.

Each reference to a story element may be by the name of the story element or by language that does not include the name of the story element. For example, the character Maester Cressen in the story A Clash of Kings may be referenced in the story by his name, such as "Maester Cressen," "Maester," or "Cressen," and/or by language that does not include his name, such as "The master." In some embodiments, as described below, despite the differences in language, each of these instances is indexed so that they are linked. Each link may be hidden or exposed during construction at the discretion of the editor or author. In other words, links are not required to be exposed. This may enable links to remain secret until the reader has passed a certain point (where the link is revealed).

The references to a story element may be of any type. For example, a reference to a character may be a description of the character, a statement made by the character, a statement made to the character, action taken by the character, or action taken against the character. When the story is in a video, a reference may be the appearance of an image of the story element, such as the appearance of a character, in a frame of the video.

Each story may be obtained from any source. For example, a story may be downloaded into the data storage system 103 from an Internet server or transferred from an external CD or flash memory. A payment for each downloaded or transferred story may be required. Alternatively, authorization could be provided to access the story on a remote server. This could also require payment or licensing. The licensing may be direct to the user or indirect, through an authorized entity such as a school (e.g., a teacher could authorize licenses for 10 students to access a story on the school server).

Each of the story indexes 107 indexes references to story elements that are in a particular story. A story index may be embedded within the story that it indexes or may be separate from it. When embedded or separate, references in the story index may be correlated to story elements in the story by encoding both the story elements in the story and in the story index with the same unique code. A story index may be transferred into the data storage system 103 along with the story that it indexes or separately at the same or a different time. A separate payment may or may not be required for a story index.

Each of the story indexes 107 is configured to be accessed by the story presentation application program 109 when running in the story presentation device 101.

Each of the story indexes 107 includes ID information 111 identifying story elements within the story. For each story element, the ID information may include a unique name, a unique code, and/or or description of the story element. When the same story element appears in multiple stories, the description of that story element in each story index for each story may be the same or may be different to reflect how that story element is presented in each story.

For example, in the Harry Potter series of books, Sirius Black is mentioned in Book One as a criminal locked away in Azkhaban prison for murder. Similarly, Scabbers is listed in Book One as a pet rat who once belonged to Percy and now belongs to Ron Weasley. In subsequent books, Sirius Black is revealed to be Harry's god father and the rat Scabbers is revealed to be Peter Pettigrew disguised as a rat. As such, the description for Siruis in Book One may not mention the relationship with Harry and the name Peter Pettigrew may not even be included in the index. By Book 3-7, they may be described in more detail. This could be subject to editorial discretion. For instance, since Peter Pettigrew's secret is revealed as a critical story element in Book Three, he may not be linked to Scabbers until the index in Book Four. Once exposed as part of the storyline, he could be listed in Books 4-7 as one character, or separately if desired by the author or editor.

Each of the story indexes 107 also includes reference information 113. The reference information identifies each location in the story at which the story element is referenced (e.g., page and line number or video frame/time). Each reference may be by the name of the story element or by language that does not include the name of the story element, as explained above.

The reference information may also include an identification of locations in other stories at which the same story element is referenced. These other stories may be limited to be only in the same type of media or may include one or more different types of media. For example, reference information for each story element in an e-book may include locations in a different e-book and/or in a video at which the same story element is referenced.

In many cases, a story element is referenced repeatedly within a sub-section of a story, such as repeatedly on the same page of an e-book or within several sequential frames in a scene of a video. In these cases, the reference information may only include a single reference to a location in the sub-section of the story at which the story element is referenced, such as the location of the first reference within that sub-section. Alternatively, the single reference may be at a location within that sub-section that is considered the most important or most relevant to the story. For example, the single reference may point to a particularly well known quote, interaction between characters, or occurrence. Similarly, multiple but not all references to the same story element may be provided within a particular sub-section. The references may be in any format, such as to a page and line number for a textual reference or to a time or frame in a video reference. The specific format of the reference may differ based on the format of the media and the viewer being used. For example, the EPUB format of a reference might look like: epub://bookishstore.com/austen/sense+sensibility/UUID/chapter1#p2, while Kindle uses a pure HTML, so a reference in Kindle might look like: <a href="PrizonerOfAzkhban.html#S1">Sirius Black.</a>. This may require that the links "#p1" or "#S1" be created during construction of tables containing the references.

The reference information about each story element provided by the index may include an extract from each location at which the story element is referenced. The extract may include the story element and information in the vicinity of the story element. For example, the reference information about a character may include a pre-determined number of words, such as 3, 4, or 5, both before and after the character is referenced. When the reference appears in a video, the reference information may include the entire video frame in which the reference appears, just a sub-portion of the frame, or a pre-determined number of frames both before and after the reference. Again, this may be dependant on the capabilities of the viewer (e.g., Kindle, Nook, Open source). Alternately, the extract may be generated on the fly when the index is later used by the story viewer application program 109.

The information identifying each location includes information that is sufficient to enable the story presentation application program to display the reference to the story element at the referenced location upon request of a viewer. The precise nature of this information may vary depending upon the type of media and format for the media (e.g., whether the media containing the story is text or a video and depending upon the format that is for the text or video). When the media is an e-book, for example, the location information may consist of a page and line number and/or a paragraph number or reference point inserted during editing. When the media is a video, on the other hand, the location information may consist of a frame number and/or a timestamp. The location may in addition or instead be a byte number within a file containing the story.

The reference information may or may not include sequence information indicating the sequence of the reference within a series of references to the same story element.

The references in the story indexes 107 may or may not be sorted and/or indexed. The sorting and/or indexing may, for example, be keyed to unique IDs for each story element, unique names for each story element, by locations at which the story elements are referenced, by the sequence in each story in which each story element is referenced, or by any combination of these.

The story indexes 107 may be in any format. For example, the story indexes 107 may be a relational database, a hierarchical database (e.g., an Oracle, MySQL, or XML file), hash maps, a CSV file, or in the same format as the stories that are reference by them. For example, the story indexes 107 may be part of an e-book and in the form of one or more tables that are subordinate objects inside of the text. They may be isolated data elements, such as xml tables at the beginning or end of the e-book, much like tables of content or listing of other books by author. One or more of the story indexes may instead be wholly separate from media that contains the story indexed by the story index.

The story indexes 107 may be created by any means. For example, the story indexes 107 may be created on an automated basis using software that automatically reads and analyzes the stories and generates the story indexes based on this information. However, such an automated approach may not be effective in indexing non-explicit references to story elements, i.e., references that do not recite the name of the story elements or recite them in a different way (e.g., Harry Potter, Harry James Potter, or James and Lily Potter's son). A manual approach may therefore be used in addition to or instead of the automated approach. Whatever approach is used, each story element or only certain types of story elements may be identified (e.g., characters, but not locations or objects), along with each location in the story at which each story element or type of story element is referenced. Indexing may be done, for example, by a publisher of the story or by a third party.

The same story may be captured in several e-books that are each in a different format (e.g., Kindle, Nook, and Open Source). To avoid having to separately generate a story index for each different version, a single index may be generated for one of the versions and stored in a generic form (e.g, in a traditional relational database). Utilities may be written that automatically transform this generic format into the format needed for each of the different types of e-books.

The user interface 117 is configured to communicate information between the story presentation device 101 and a viewer of the stories 105. The user interface 117 may be of any type. For example, the user interface 117 may include a display, which may include a touch screen, a real and/or virtual keyboard, a pointing device, a loud speaker, and/or a microphone, among others.

The data processing system 115 includes one or more microprocessors or other data processing devices. It may also include related hardware components, such as support chips, as well as related software components, such as an operating system and device drivers. The data processing system 115 is configured to access the stories 105, the story indexes 107, and the story presentation application program 109 from the data storage system 103 and to run and perform the functions specified by the story presentation application program 109, as described below, including communicating with a viewer through the user interface 117.

The story presentation application program 109 is a computer software program that, when read and implemented by the data processing system 115, causes the story presentation device 101 to perform the functions described herein, including presentation of the screens illustrated in FIGS. 7-10 based on information in the story indexes 107.

For example, the story presentation application program 109 is configured to display a selected one of the stories 105 to the viewer using the user interface 117. The story presentation application program 109 includes user-operated controls that allow a viewer to view sequential portions of the story and to branch to any portion (such as that provided by the index) when requested by the viewer. The story presentation application program 109 may also be configured to allow a user to search through a story for a specified word or image.

The story presentation application program 109 is also configured to allow a viewer to request an index of references to a story element that is specified by the viewer while the story is being displayed. The viewer may specify such a story element, for example, by clicking on it while it is displayed on the user interface 117. The viewer may in addition or instead specify such a story element by directly entering its name or other unique characteristic(s) in a dialog box that may be displayed at the edge of the display, through a pull-down window or using a pop-up box.

When the story is a video, the story presentation application program 109 may include image recognition software that is configured to recognize an image that is selected by the viewer and to convert the recognized selection into the unique name or code of that story element. The video may instead be encoded with zones on each frame that define the image of each story element and may associate this zone with the unique name or code of the defined story element. Consequently, the number of zones may vary between frames so that one frame may not contain any unique names or codes while another frame may contain multiple zones each with a unique name or code. Alternately, a frame may merely contain multiple unique names or codes without associating these unique names or codes with different zones within the frame.

The story presentation application program 109 is configured to look up a specified story element in the story index for that story. The story presentation application program 109 is configured to display a list of the references to that story element that are contained within the story index. The references may be limited to only those references in the story in which the story element was specified (the story that is being read or watched) or may include references to the specified story element in other stories in addition to the story in which the story element was specified, including other stories in media of a different type (e.g., in videos when the story element was selected from an e-book and vice versa).

The list of references may be in any form. For example, the list may display an extract of the reference to the specified story element in the index from each location at which the story element is referenced. As indicated above, this extract may include the reference to the story element at the indexed location and information in the vicinity of the reference to the story element. This information may be extracted by the device from the story and thus may not need to be part of the story index. The list may also display the unique name and/or unique code of the story element, a description of the story element, and/or the name of each story in which the story element appears. The list may be presented in any manner, such as in a separate window (e.g., pop-up box or drop down list) from the story.

The story presentation application program 109 is configured to allow the viewer to select one of the references from the list. In response to such a selection, the story presentation application program 109 is configured to display the story element at the location in the story that corresponds to the selected reference. The story presentation application program 109 may or may not give emphasis to the story element at the selected location, such as by highlighting or underlining it. The story presentation application program 109 may or may not thereafter continue to display the menu of references, thereby enabling the view to select other references for viewing without again specifying the desired story element.

The story presentation application program 109 may be configured to store a record of the viewers' selections of references in the data storage system 103 or elsewhere. The story presentation application program 109 may be configured to then enable the viewer to go back and view any earlier reference that was selected. Standard browser logic may be used for this purpose to create a sequence stack.

The story presentation application program 109 may be configured to provide a reference to a specified story element in a story that has not yet been purchased or downloaded. In this situation, the story presentation application program 109 may be configured to ask whether the viewer wishes to purchase or download this story. If so, the story presentation application program 109 may be configured to facilitate this purchase or download.

When a series get more mature, there may be several books listed in an index (see e.g., FIG. 4). For some series, there could be dozens of books, each capable of standing on its own, such as the "Hardy Boys," Nancy Drew," or the "James Bond" series of books. If a person reading a book is particularly enamored by a character or doing research on a character, they may want to follow it to the next or previous book. This might only require a single listing in the table illustrated in FIG. 6, showing that the character appeared in a different book, not every appearance in that other book. To chase the link, the other book may be in the storage system and that other book's index can be scanned. If it is not found, then the user may be prompted to buy it (or download it, if previously purchased and simply not on the current device.) In this example, the character would appear in the table in FIG. 5 in both books, but not in the table in FIG. 5 for all the books in the series.

The story presentation application program 109 may be configured to present various options to the viewer. These options may be of any type, such as options related to which kinds of story references are displayed. For example, one option may be to show or to block references to a selected story element in stories other than the one being viewed. Another option may be to show or block references to stories that have not yet been purchased. A still further option may be to show references to stories released prior to the one being viewed, but not subsequent. Another option may be to allow the user to prevent references subsequent in the story and in other subsequently purchased/downloaded stories to reduce the chance of obtaining "spoilers" for someone who has not previously read/watched the story (or stories).

Figure 2:
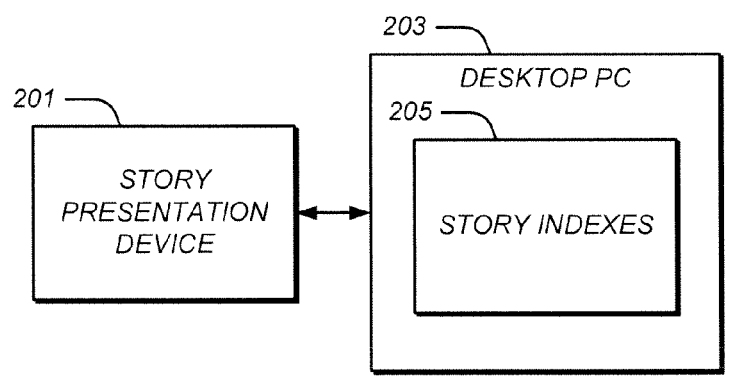
FIG. 2 illustrates a different example of a story presentation device in which the story indexes are within an external desktop PC, rather than within the story presentation device.

FIG. 2 illustrates a different example of a story presentation device 201 in which the story indexes 205 are within an external desktop PC 203, rather than within the story presentation device 210. In this configuration the story presentation application program 109 may be configured to access the story indexes 205 from the desktop PC 203, rather than from the data storage system 103, when an indexed reference is desired based on user activation at the story presentation device 201. The story presentation device 201 and the story indexes 205 may in all other respects be the same as the story presentation device 101 and the story indexes 107, respectively.

FIG. 3 illustrates a different example of a story presentation device 301 in which the story indexes 307 are within an external Internet server 305 that is configured to communicate with the story presentation device 301 over the Internet 303. In this configuration the story presentation application program 109 may be configured to access the story indexes 307 from the Internet server 305, rather than from the data storage system 103, when an indexed reference is desired based on user activation at the story presentation device 301. The story presentation device 301 and the story indexes 307 may in all other respects be the same as the story presentation device 101 and the story indexes 107, respectively.

In both FIGS. 2 and 3, one or more of the stories 105 themselves may instead be present in the Desktop PC (FIG. 2) or the Internet server (FIG. 3). One or more of the story indexes 107 and/or the stories 105 may instead be in an Internet cloud.

FIG. 4 illustrates an example of a portion of one of the story indexes 107 illustrated in FIG. 1, namely a table of a related series of stories, each containing references to some of the same story elements. As illustrated in FIG. 4, each story in the table may include a unique a book ID, a title (which may or may not be unique), a unique ISBN, and the name(s) of the author(s) of each story. The ISBN may facilitate purchase of the story. A bar code or other key for identifying the story for purchase might also be included. The ISBN may also be used for doing searches in Amazon or external reference sources. The author might be useful in indices of historical works, where the authors might all be different for each title that is an autobiography of, for example, Benjamin Franklin. A pop up window (e.g., FIG. 8) might likely only show the title, but the other data may show when the user mouses over or selects an entry. The items in the table are given by way of example, and other information or items may be provided instead of or in addition to those shown. For example, the ISBN is given as a common identifier that may be used to locate a copy of another work. However, for an on-line catalog or download/streaming service, the table may use a catalog identifier or one of the other items may appear as a link that can be selected to navigate to a location from which the user can purchase a selected one of the identified stories.

FIG. 5 illustrates an example of another portion of one of the story indexes illustrated an FIG. 1, namely a table of story elements that are characters in this instance. As illustrated in FIG. 5, each character may include a unique character ID, the unique book ID of the book in which the character appears, the name of the character (which may or may not be unique), a description of the character, and an order that represents a preference or appearance for the name. For example, the character may be introduced as "Lord Voldemort" and be known by that name through several stories. The same character may later be revealed to have been called "Tom Marvolo Riddle." Both might be assigned to the same character ID, but with different names. The order might be the order in which to show the names. Depending on editorial discretion, for example, the alias "The Dark Lord" might also be used as a third order name for the same character. Order in this case may be used to show the various AKA's in a particular order.

A table for a particular story may only list the story elements within that story, even though other stories within the series contain other story elements. The description of a story element that is within multiple stories may be different in each story index to better conform to the way that element is presented in the story.

FIG. 6 illustrates an example of another portion of one of the story indexes illustrated in FIG. 1, namely a table of story element locations. As illustrated in FIG. 6, each story element location includes a character ID, a book ID, a chapter reference, a page reference, and an Href constituting a functional link to the reference. In the event that there are multiple references to the same story element with a sub-portion of a story, such as on the same page, all, some or only one of the references may be included, such as only the first reference. Following the example above, "Lord Voldemort" might be the only listing in Book One, but for books 2-7 when the connection to Tom Riddle is made, both might appear.

Figure 7:
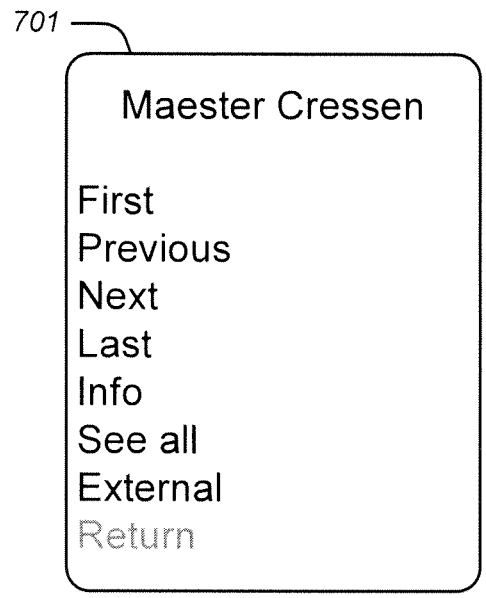
FIG. 7 illustrates an example of a menu that the story presentation application program in FIG. 1 causes to be displayed upon request of a viewer for an index of references to a specified story element.

FIG. 7 illustrates an example of a menu 701 that the story presentation application program 109 in FIG. 1 causes to be displayed upon request of a viewer for an index of references, e.g., within the story, to a specified story element. In response to this request, the story presentation application program 109 may cause the menu 701 to appear.

Figure 9:
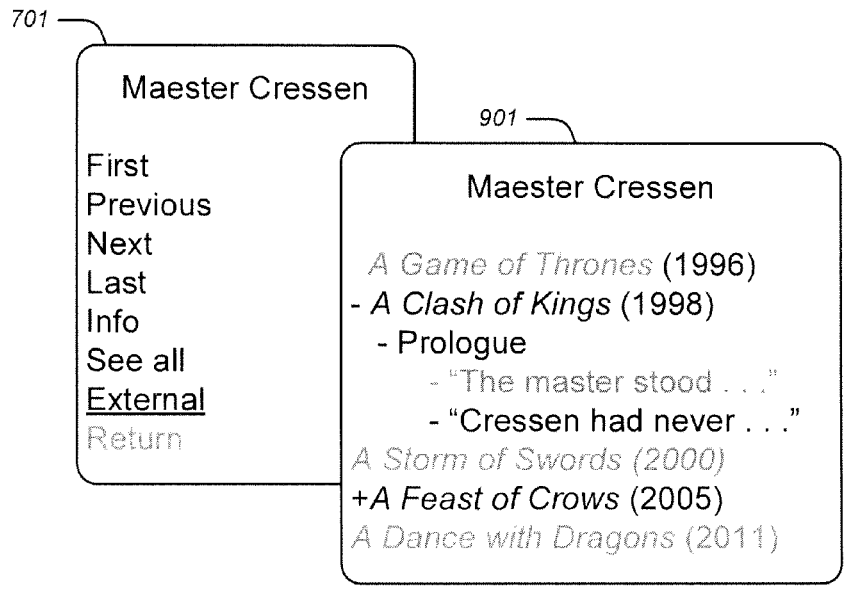
FIG. 9 illustrates an example of a menu that the story presentation application program in FIG. 1 causes to be displayed in response to the viewer selecting the "External" choice in the menu illustrated in FIG. 7.

The menu 701 includes a "First" choice that, when selected, causes the first reference to the specified story element to be displayed; a "Previous" choice that, when selected, causes the previous reference to the specified story element to be displayed; a "Next" choice that, when selected, causes the next reference to the specified story element to be displayed; a "Last" choice that, when selected, causes the last reference to the specified story element to be displayed; an "Info" choice that, when selected, causes the description of the specified story element to be displayed; a "See all" choice that, when selected, causes all references to the specified story element within the current story to be displayed; an "External" choice that, when selected, causes all references to the specified story element to be displayed, including those in other stories, such as is illustrated in FIG. 9 and discussed below; and a "Return" choice that, when selected, returns the viewer to the last previously selected reference to the specified story element. If a reference appears in another book, the actual line may not be seen unless the book is available to the reader. However, a link showing the reference may appear in the book. A reference may be displayed by showing the page in the book or the first image frame in a video at which the reference appears. The reference may or may not be highlighted or in some other way emphasized.

Menu choices that are not currently available may be dimmed or displayed in a different color (or otherwise differentiated from those of available menu choices). For example, the "Return" choice may be dimmed when no previous reference to the specified story element was selected; the "First" choice may be dimmed when the specified story element constitutes the first reference; the "Previous" choice may be dimmed when there is no previous reference to the specified story element; the "Next" choice may be dimmed when there is no subsequent reference to the specified story element; the "Last" choice may be dimmed when the viewed reference is the last reference; and the "External" choice may be dimmed when there are no references to the specified story element outside of the story being viewed. The availability of these menu choices may be determined by the story presentation application program 109 based on the information in the story index about the story element that has been selected.

Figure 8:
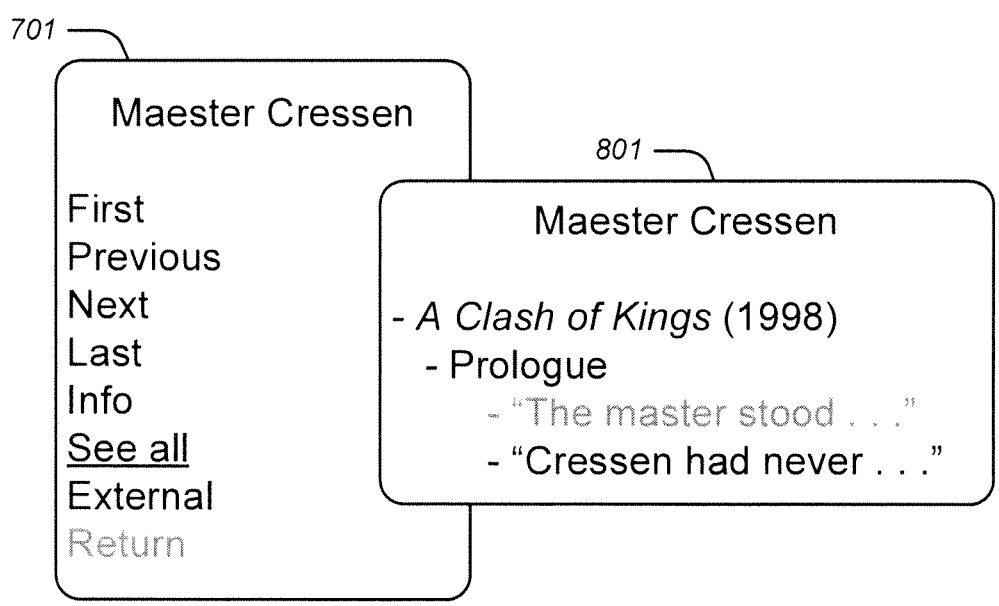
FIG. 8 illustrates an example of a menu that the story presentation application program in FIG. 1 causes to be displayed in response to the viewer selecting the "See all" choice in the menu illustrated in FIG. 7.

FIG. 8 illustrates an example of a menu 801 that the story presentation application program in FIG. 1 causes to be displayed in response to the viewer selecting the "See all" choice in the menu 701 illustrated in FIG. 7. As illustrated in FIG. 8, the menu 801 lists the name of the story in which the specified story element appears, the name of the chapter in which references to the specified story element appears, and references to the specified story element that include an extract of the specified story element from each reference. The reference to the specified story element that is currently being viewed may be dimmed or provided in a different color. As illustrated in FIG. 8 by the reference to the character "Maester Cressen" by the quoted phrase "The master stood . . . ", there may be references to a story element other than by the name of the story element. The information in the menu 801 may be extracted by the story presentation application program 109 from the story index for the story.

FIG. 9 illustrates an example of a menu 901 that the story presentation application program in FIG. 1 causes to be displayed in response to the viewer selecting the "External" choice in the menu 701 illustrated in FIG. 7. Names of related stories in which the specified story element does not appear, such as other stories in a series, may be dimmed or provided in a different color. The information in the menu 901 may be extracted by the story presentation application program 109 from the story index for the story.

Figure 10:
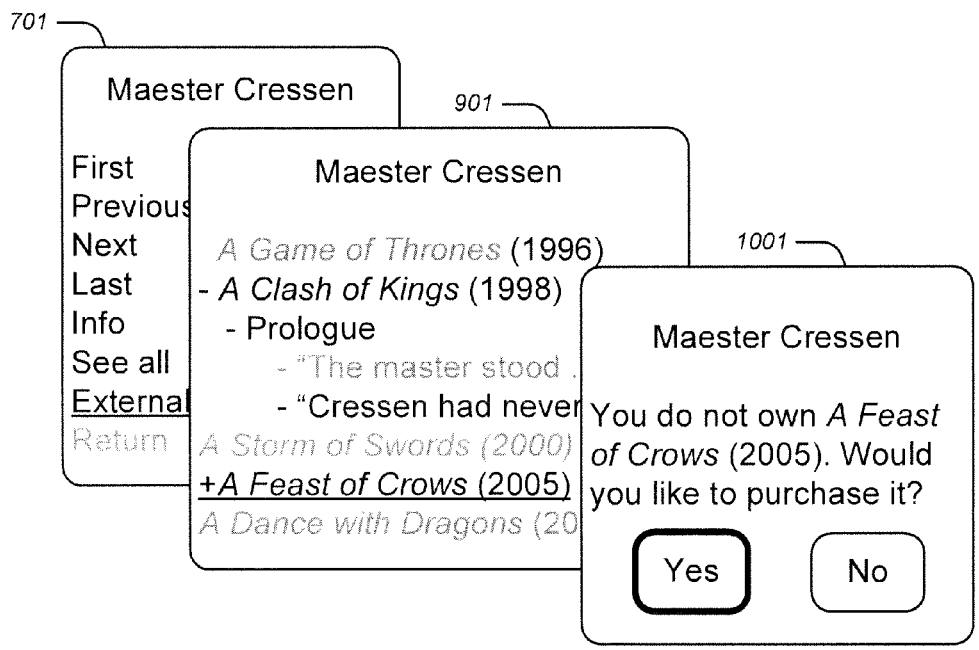
FIG. 10 illustrates an example of a dialog box that the story presentation application program in FIG. 1 causes to be displayed in response to the viewer selecting a story in the menu that is illustrated in FIG. 9 that the viewer has not purchased.

FIG. 10 illustrates an example of a dialog box 1001 that the story presentation application program in FIG. 1 causes to be displayed in response to the viewer selecting a story in the menu 901 that the viewer has not purchased. In the event that the viewer elects to purchase the missing story, the references to the specified story element that appear in that missing story may then be displayed. In some configurations, the references may be displayed, even before the viewer has purchased the missing story. The information in the menu 901 may be extracted by the story presentation application program 109 from the story index for the story.

Figure 11A:
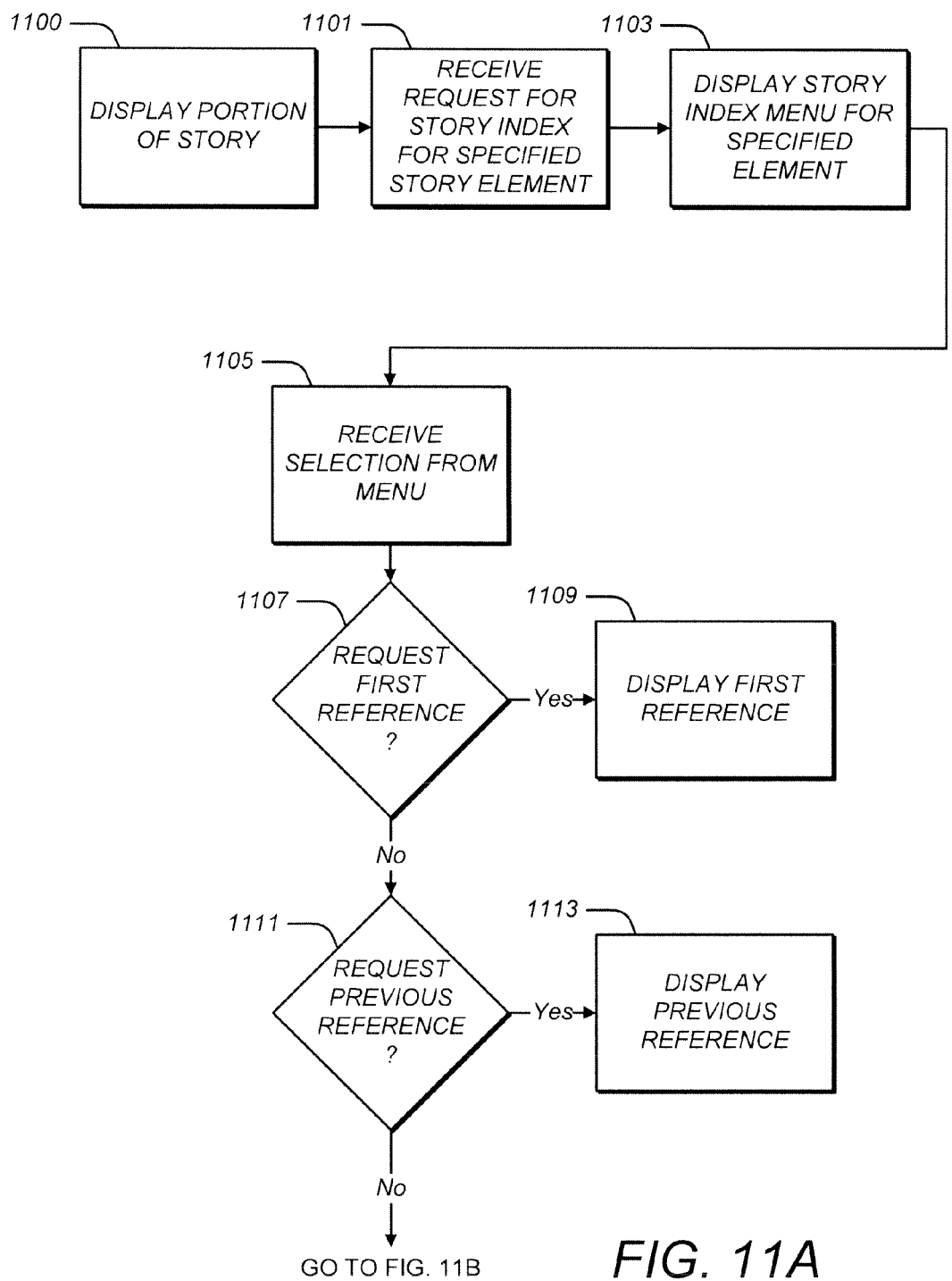
FIGS. 11A-11C illustrate an example of a process that is implemented by the story presentation device illustrated in FIG. 1.
Figure 11B:
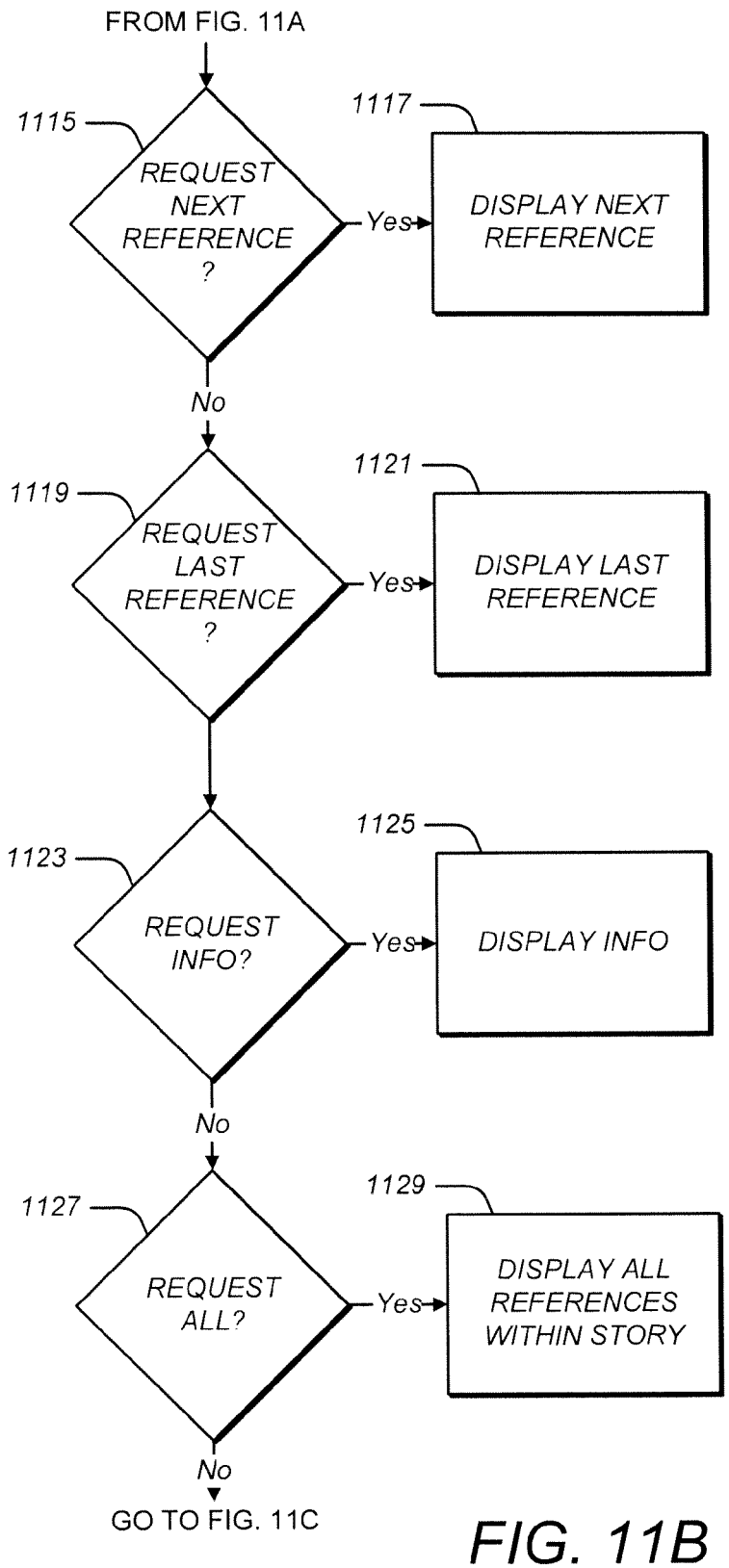
Figure 11C:
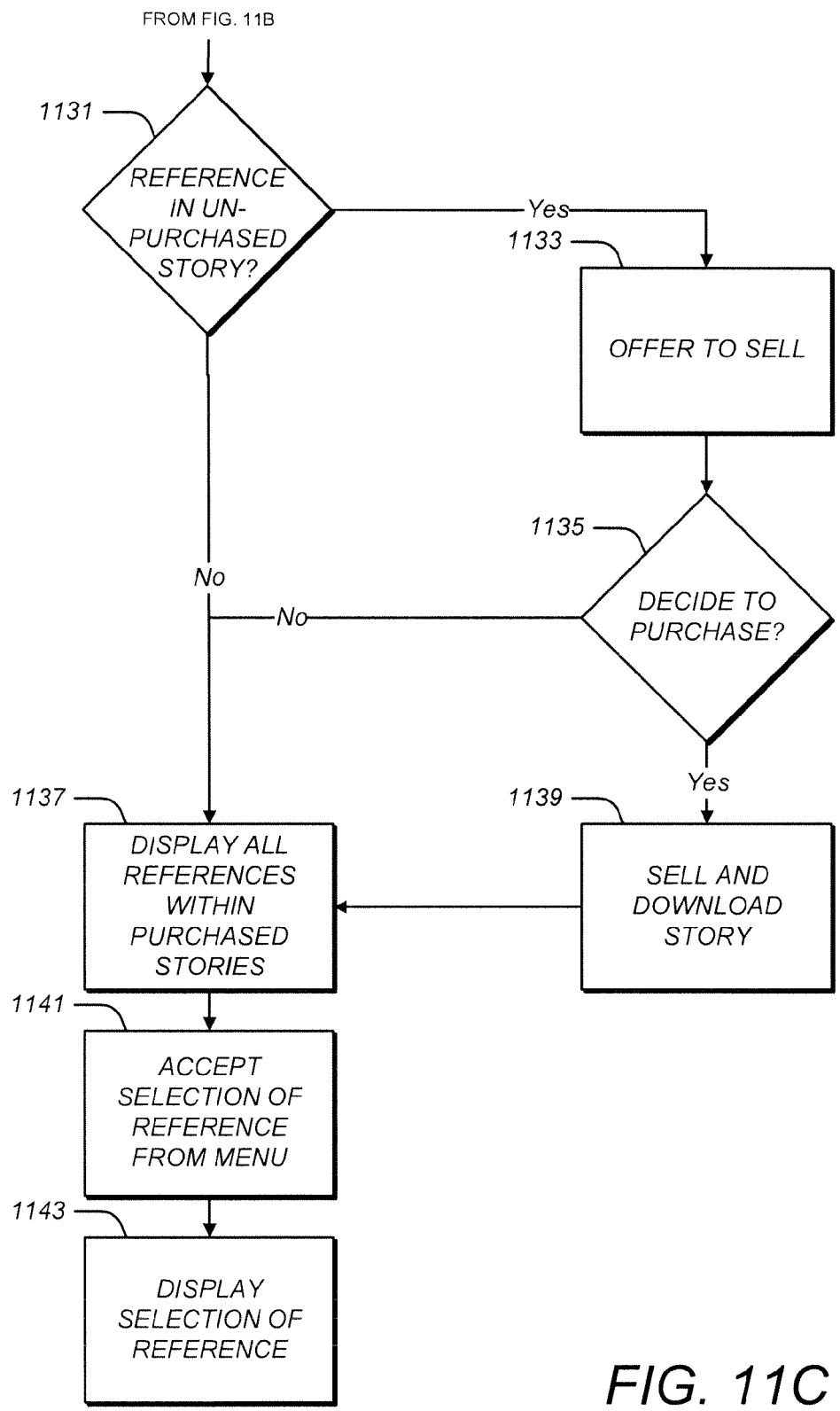

FIGS. 11A-11C illustrate an example of a process that is implemented by the story presentation device illustrated in FIG. 1. The steps of this process are the same as those discussed above. Specifically, and by way of summary, the story presentation device displays a portion of a story, as reflected in a Display Portion of Story step 1000. The story presentation device then receives a request for a story index for a specified story element, as reflected by a Receive Request for Story Index for Specified Story Element step 1101. In response, the story presentation device displays a menu of index options for that story element, as reflected by a Display Story Index Menu For Specified Element step 1103. The story presentation device then receives a selection from that menu, as reflected by a Receive Selection From Menu step 1105. If the menu is the one illustrated in FIG. 7, for example, the first reference is displayed if requested, as reflected by a Request First Reference? decision step 1107 and a Display First Reference step 1109. Similarly, the previous reference is displayed if requested, as reflected by a Request Previous Reference? decision step 1111 and a Display Previous Reference step 1113. Similarly, the next reference is displayed if requested, as reflected by a Request Next Reference? decision step 1115 and a Display Next Reference step 1117. Similarly, the last reference is displayed if requested, as reflected by a Request Last Reference? decision step 1119 and a Display Previous Reference step 1121. Similarly, descriptive information about the story element is displayed if requested, as reflected by a Request Info? decision step 1123 and a Display Info step 1125. Similarly, all references within the story are displayed if requested, as reflected by a Request All? decision step 1127 and a Display All References Within Story step 1129. If none of the foregoing was selected, this means that the "External" (i.e., last) menu entry was selected. In this event, a check is made to determine whether any references are in stories that have not been purchased, as reflected by a Reference in Un-Purchased Story decision step 1131. If so, an offer to sell that story is made, as reflected by an Offer to Sell step 1133. If the offer is accepted, the story is sold and downloaded, as reflected by a Sell and Download Story step 1139. In any event, all references within the purchased stories are displayed, as reflected by a Display All References Within Purchased Stories step 1137. The story presentation device then accepts a selection of a reference, as reflected by an Accept Selection of Reference From Menu step 1141, following which the selected reference is displayed, as reflected by a Display Selection of Reference step 1142. Any approach may be followed to create the story indexes 107. One approach, for example, when preparing digital content, an editor may be reviewing the data for content, spelling and continuity in much the same way as any book editor. The "editor" may be a person or a machine or a combination of them. During this phase, the person or machine editor may load the content into a reader. They can then select text for each reference using, for example, a mouse, pen, or touch screen. After doing so, they may be presented with a pop up window to select the character to ascribe the context to.

Figure 12A:
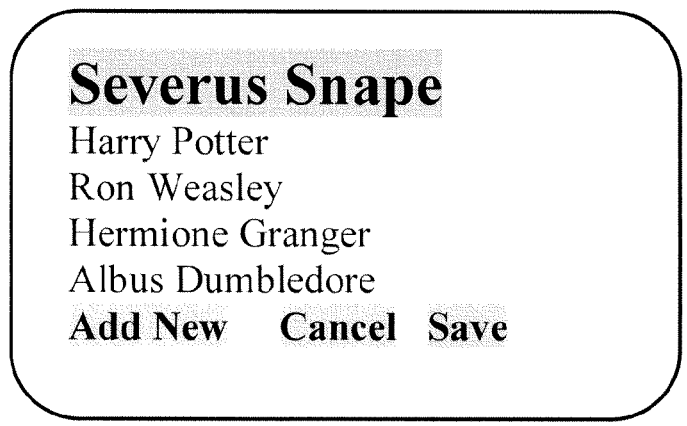
FIG. 12A-12C illustrate examples of dialog boxes that enable an editor to select or specify the name of a story element that should be associated with selected text as part of a process of generating a story index.
Figure 12B:
Figure 12C:
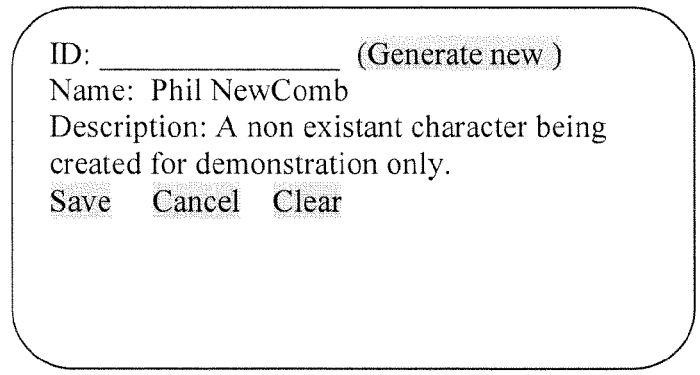

FIG. 12A-12C illustrate examples of dialog boxes that enable an editor to select or specify the name of a story element that should be associated with selected text as part of a process of generating a story index.

The dialog box in FIG. 12A may be configured to appear automatically when an editor selects a story element in a story. The dialog box may use heuristics to determine the names of the most likely story elements based on the content of the selection and names that were previously entered and saved. The dialog box may also present the name of the most likely story element first in a text box, as also illustrated in FIG. 12A.

If present, the editor may select the correct name. Otherwise, the editor may type in the desired element name. The system might then attempt to match the typed in name as it is being typed to previous entries, and show these as possible choices. FIG. 12B illustrates an example of this if the user typed in "Phi" in the dialog box illustrated in FIG. 12A. The editor may then again select the correct name.

Once the correct name is selected in FIG. 12A or 12B, the editor may click the "Save" button in the pending dialog box to save the selection. The editor may instead just double click the correct name to cause an automatic save.

If the correct name does not appear in either FIG. 12A or 12B, the editor may click the "Add New" button in either FIG. 12A or 12B, following which the dialog box illustrated in FIG. 12C may appear.

If this is a new story element, the editor may select the "Generate ID" button. A new ID may then be automatically generated that is unique within the index for the story. The editor may then enter the name and description of the new story element. The editor may then click the "Save" button to save the selection, following which the ID, name, and description of the new story element is saved.

If the selected reference is instead an alias of an existing story element, the editor may instead enter just the ID of that story element. The editor may then click the "Save" button to save the new name, following which the new name is saved as an alias for the story element linked to the same ID as the other aliases for that story element.

The editor may click the "Cancel" button in FIG. 12A, 12B, or 12C to cancel the selection process, following which the open window may close.

When a new story element is selected and saved, an entry may be created in a reference table to the first byte in the selected text selected (depending on file format, a ref may be created in the book text) using the ID of the story element.

If a story is part of a series, then the next story that is part of the series may be indexed in the same way. As part of this process, the editor may import the story indexes from all previous stories in the series, thus obviating the need to reenter this information and preserving the unique ID of each element. This import may be made from other sources that have these indexes, such as from a library of indexes.

When multiple stories are indexed as a series, the story index for each story may include information indicating whether each reference is a reference to the story or to another story in the series. The index for each story may only contain references to elements that are referenced in that story, even though additional elements may be inherited from other stories in the series.

In summary, a story index may index links to story elements that are referenced in a story, such as to characters. The story elements may be referenced in the story by name and by language that does not include the name. The story index may also contain links to the same story elements in other associated stories, including other stories in a series or that are in a different type of media. A viewer may view the entries in the story index and select a specified reference for viewing. The selected reference may then be displayed at its location in the story or associated story. The other associated stories may be purchased and downloaded when not otherwise available.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A non-transitory computer-readable storage medium containing a story presentation application program that, when run in a story presentation device, is configured to cause the story presentation device to perform the following steps:
   display a portion of a story of a series of stories to a viewer on a display of the story presentation device;
   in response to a request from the viewer for an index of references to a viewer selected story element that is within the displayed portion of the story,
   retrieve unique ID information for the selected story element; and
   index a database of story elements by the unique ID information to generate an index of references to the selected story element, wherein the selected story element and multiple variations of the selected story element are identified by the unique ID information, and the unique ID information is different from the selected story element and from the multiple variations of the selected story element;
   display the index of references to the selected story element, wherein the references in the index include references to locations in the displayed story; and
   in response to another request from the viewer to display references to another variation of the selected story element, display past and future references to the other variation of the selected story element in the story, relative to a current location,
   display, depending on options selected by the viewer, the past and future other references to the other variation of the story element, different from the one variation of the selected story element, the other variation of the story element first occurring in the displayed story, wherein the other variation is not identified by the unique ID of the selected story element in the story index of the displayed story and the references to the other variation are not displayed as a variation of the selected story element in the displayed story and, the other variation of the selected story element is identified by the unique ID in another story, subsequent to the displayed story in the series of stories and any references to the other variation are displayed as a variation of the selected story element in the other story.

2. The non-transitory computer-readable storage medium of claim 1 wherein at least one of the variations of the selected story element is a character in the story.

3. The non-transitory computer-readable storage medium of claim 1 wherein at least one of the variations of the selected story element is not a character in the story.

4. The non-transitory computer-readable storage medium of claim 1 wherein the multiple variations of the selected story element are contained within an e-book.

5. The non-transitory computer-readable storage medium of claim 1 wherein the multiple variations of the selected story element are contained within a video.

6. The non-transitory computer-readable storage medium of claim 1 wherein the story presentation application program is configured, when run in the story presentation device, to cause the story presentation device, in response to the viewer's request for an index of references to the selected story element that is within the displayed portion of the story, to display an extract from at least one location in the story at which the selected story element is referenced that includes the selected story element and information in the vicinity of the selected story element.

7. The non-transitory computer-readable storage medium of claim 1 wherein the story presentation application program is configured, when run in the story presentation device, to cause the story presentation device, in response to the viewer's request for an index of references to the selected story element that is within the displayed portion of the story, to display a description of the selected story element.

* * * * *